United States Patent
Hikichi et al.

(10) Patent No.: US 9,701,066 B2
(45) Date of Patent: Jul. 11, 2017

(54) CURING AGENT FOR THREE-DIMENSIONAL SHAPED PRODUCT, APPARATUS FOR MANUFACTURING THREE-DIMENSIONAL SHAPED PRODUCT, AND NON-TRANSITORY COMPUTER READABLE MEDIUM STORING PROGRAM FOR MANUFACTURING THREE-DIMENSIONAL SHAPED PRODUCT

(71) Applicant: FUJI XEROX CO., LTD., Tokyo (JP)

(72) Inventors: Takehito Hikichi, Kanagawa (JP); Naoki Hiji, Kanagawa (JP); Takashi Morikawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 26 days.

(21) Appl. No.: 14/807,412

(22) Filed: Jul. 23, 2015

(65) Prior Publication Data
US 2016/0257076 A1 Sep. 8, 2016

(30) Foreign Application Priority Data

Mar. 2, 2015 (JP) ................................ 2015-040147

(51) Int. Cl.
| | |
|---|---|
| *C08F 2/46* | (2006.01) |
| *C08G 61/04* | (2006.01) |
| *B29C 67/00* | (2017.01) |
| *C08F 4/00* | (2006.01) |
| *C08G 59/40* | (2006.01) |
| *C08G 65/18* | (2006.01) |

(52) U.S. Cl.
CPC ............ *B29C 67/0088* (2013.01); *C08F 4/00* (2013.01); *C08G 59/40* (2013.01); *C08G 65/18* (2013.01)

(58) Field of Classification Search
CPC ....... B29C 67/0088; C08F 4/00; C08G 59/40; C08G 65/18
USPC .................................. 522/170, 168, 1; 520/1
See application file for complete search history.

(56) References Cited

U.S. PATENT DOCUMENTS

| | | | | |
|---|---|---|---|---|
| 8,426,484 | B2 * | 4/2013 | Onclin | C08F 2/50 520/1 |
| 2005/0014005 | A1 * | 1/2005 | Kramer | B29C 67/0059 428/413 |
| 2005/0244975 | A1 * | 11/2005 | Rakow | G01N 33/442 436/85 |
| 2007/0021521 | A1 * | 1/2007 | Cheng | C08F 2/46 522/1 |

FOREIGN PATENT DOCUMENTS

| | | |
|---|---|---|
| JP | H06-99505 A | 4/1994 |
| JP | H08-20073 A | 1/1996 |
| JP | 2007-106070 A | 4/2007 |

* cited by examiner

*Primary Examiner* — Jessica E Whiteley
(74) *Attorney, Agent, or Firm* — Oliff PLC

(57) ABSTRACT

Provided is a curing agent for a three-dimensional shaped product including a compatible material that is compatible with a molded article forming agent for forming a three-dimensional shaped product, and a curing material that cures the molded article forming agent.

2 Claims, 12 Drawing Sheets

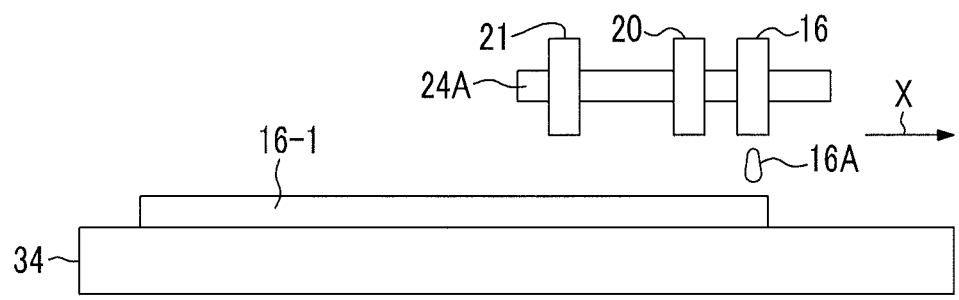
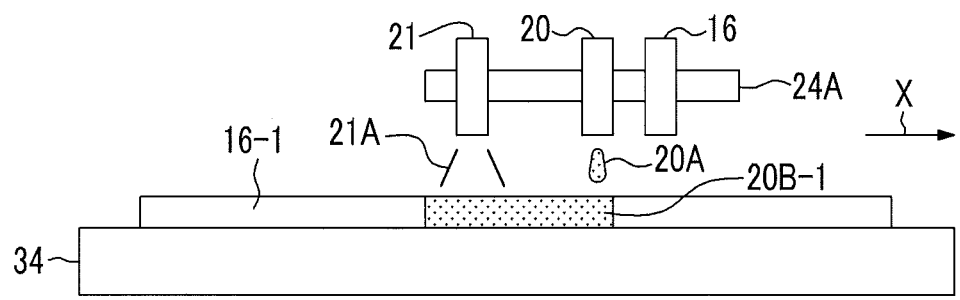
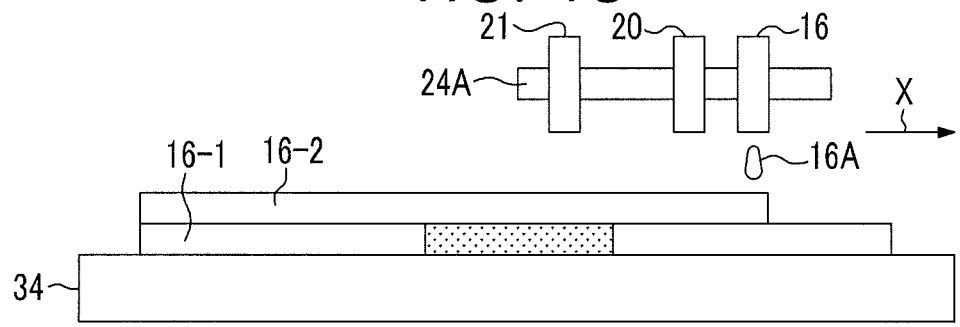
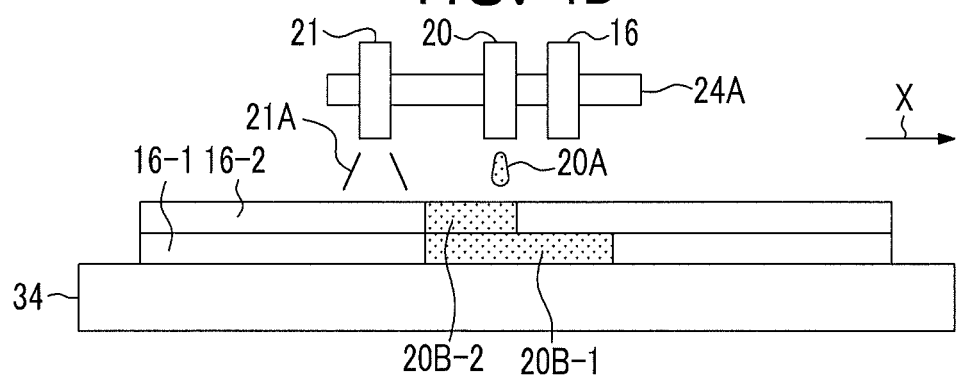

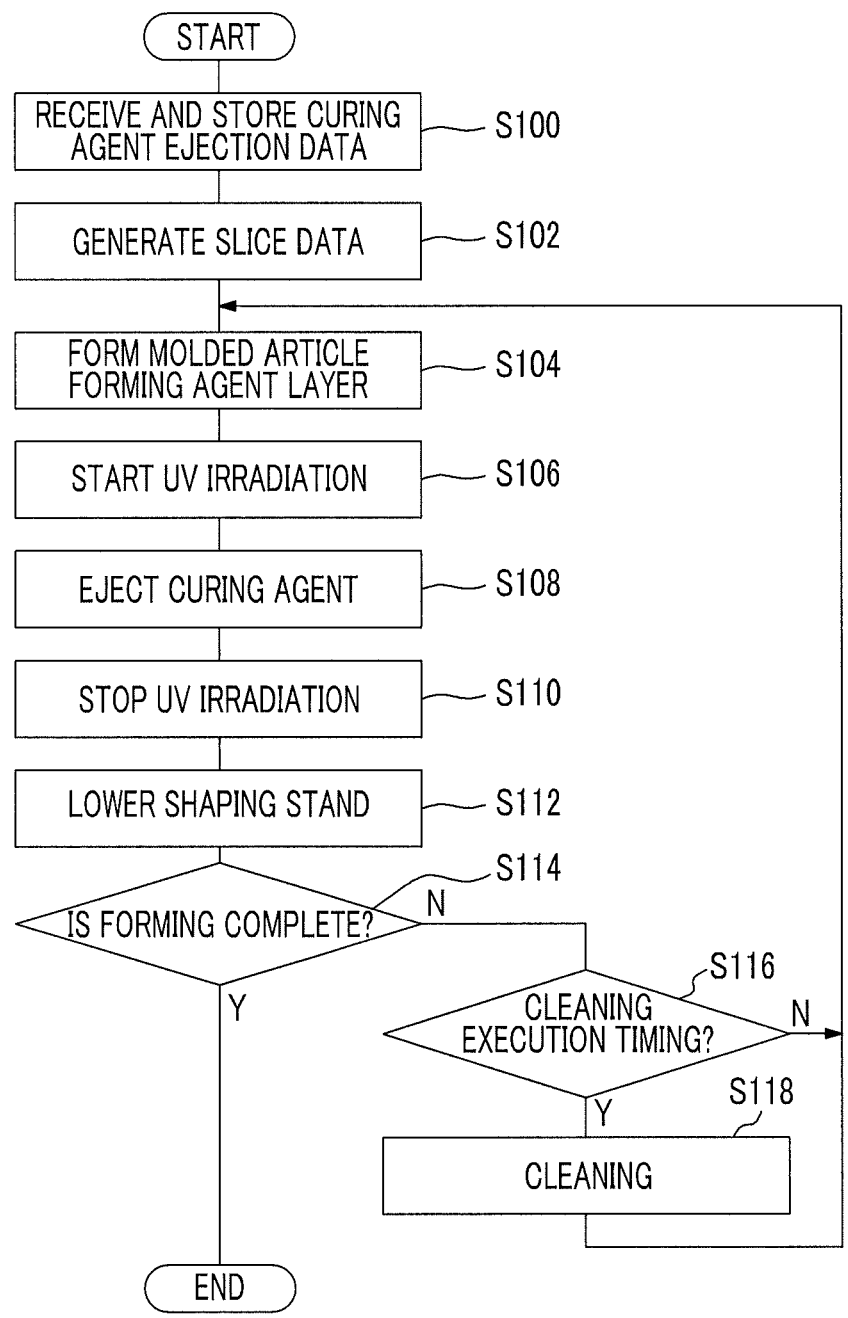

CURING AGENT FOR THREE-DIMENSIONAL SHAPED PRODUCT, APPARATUS FOR MANUFACTURING THREE-DIMENSIONAL SHAPED PRODUCT, AND NON-TRANSITORY COMPUTER READABLE MEDIUM STORING PROGRAM FOR MANUFACTURING THREE-DIMENSIONAL SHAPED PRODUCT

CROSS-REFERENCE TO RELATED APPLICATIONS

This application is based on and claims priority under 35 USC 119 from Japanese Patent Application No. 2015-040147 filed Mar. 2, 2015.

BACKGROUND

Technical Field

The present invention relates to a curing agent for a three-dimensional shaped product, an apparatus for manufacturing a three-dimensional shaped product, and a non-transitory computer readable medium storing a program for manufacturing a three-dimensional shaped product.

SUMMARY

According to an aspect of the invention, there is provided a curing agent for a three-dimensional shaped product including:

a compatible material that is compatible with a molded article forming agent for forming a three-dimensional shaped product; and a curing material that cures the molded article forming agent.

BRIEF DESCRIPTION OF THE DRAWINGS

Exemplary embodiments of the present invention will be described in detail based on the following figures, wherein:

FIGS. 4A to 4D are diagrams illustrating a process for manufacturing a three-dimensional shaped product;

FIG. 5 is a flowchart of processing that is executed by a controller;

DETAILED DESCRIPTION

Hereinafter, a detailed description will be given of exemplary embodiments of the present invention with reference to drawings.

First Exemplary Embodiment

Figure 1:
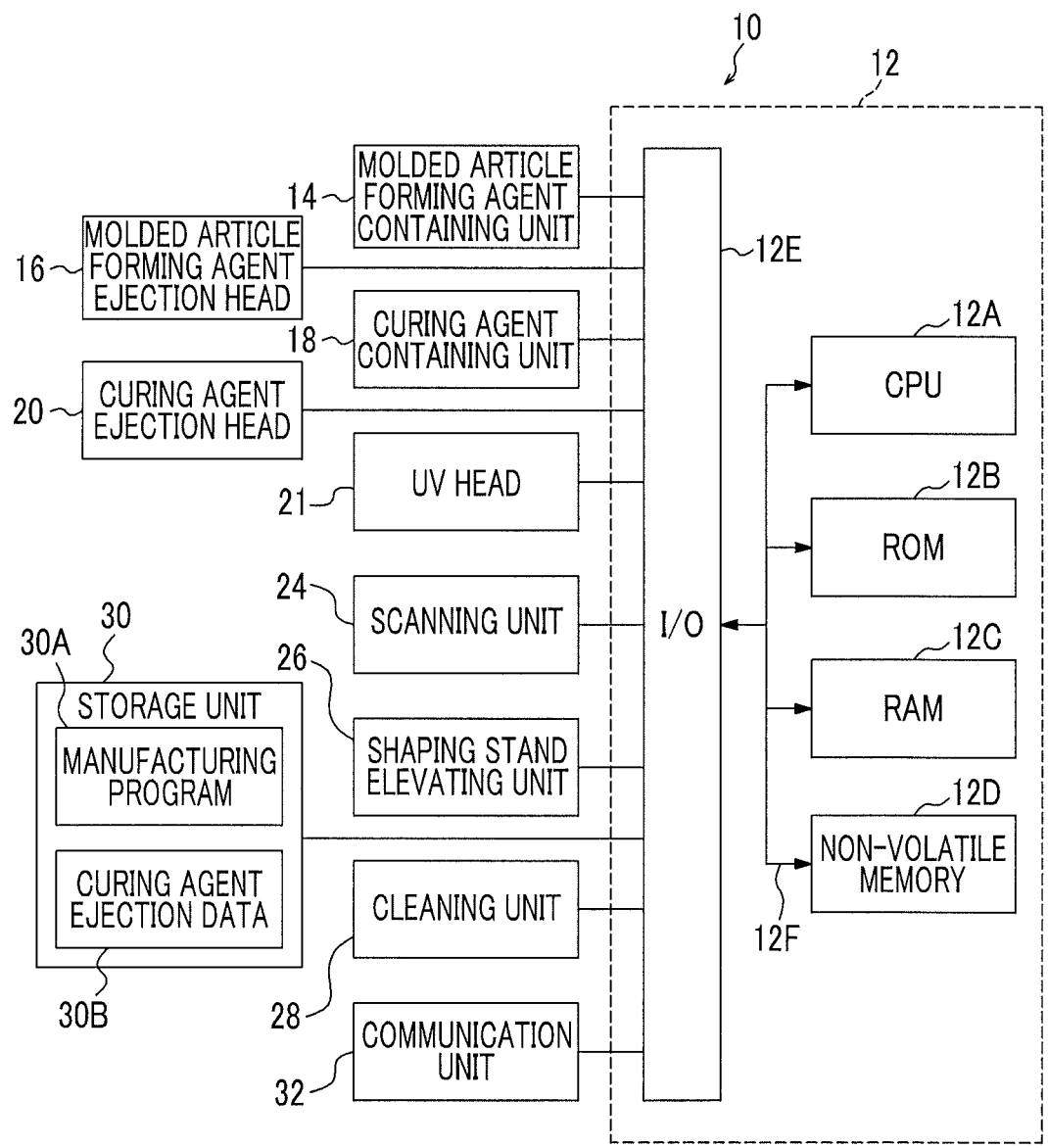
FIG. 1 is a block diagram of an apparatus for manufacturing a three-dimensional shaped product according to a first exemplary embodiment.

FIG. 1 is a block diagram of an apparatus 10 for manufacturing a three-dimensional shaped product according to a first exemplary embodiment. As illustrated in FIG. 1, the manufacturing apparatus 10 includes a controller 12.

The controller 12 has a configuration in which a Central Processing Unit (CPU) 12A, a Read Only Memory (ROM) 12B, a Random Access Memory (RAM) 12C, a non-volatile memory 12D, and an input and output interface (I/O) 12E are respectively connected via a bus 12F.

The respective functional units such as a molded article forming agent containing unit 14, a molded article forming agent ejection head 16, a curing agent containing unit 18, a curing agent ejection head 20, a UV head 21, a scanning unit 24, a shaping stand elevating unit 26, a cleaning unit 28, a storage unit 30, and a communication unit 32 are connected to the I/O 12E.

The molded article forming agent containing unit 14 contains a molded article forming agent for forming a three-dimensional shaped product. The molded article forming agent is configured of UV curable resin or the like that is cured when irradiated with UV, namely ultraviolet light, for example, in this exemplary embodiment.

Specifically, a (meth)acrylate such as epoxy (meth)acrylate, urethane (meth)acrylate, or polyester (meth)acrylate, cationic polymerization epoxy, vinyl ether, or oxetane, for example, is used as the molded article forming agent.

The molded article forming agent ejection head 16 ejects the molded article forming agent, which is supplied from the molded article forming agent containing unit 14, in response to an instruction from the CPU 12A. As the molded article forming agent ejection head 16, a dye head is used, for example.

The curing agent containing unit 18 contains the curing agent for curing the molded article forming agent. The curing agent is a two-liquid type curing agent that contains a compatible material that is compatible with the molded article forming agent and a curing material for curing the molded article forming agent.

Specifically, the same molded article forming agent as the molded article forming agent that is ejected from the molded article forming agent ejection head 16 is used as the compatible material in this exemplary embodiment. In addition, the material may not be the same as the molded article forming agent that is ejected from the molded article forming agent ejection head 16, and another material may be used as long as the material is compatible with the molded article forming agent that is ejected from the molded article forming agent ejection head 16.

In a case of using a (meth)acrylate such as epoxy (meth)acrylate, urethane (meth)acrylate, or polyester (meth)acrylate as the compatible material, namely as the molded article forming agent, a radical-photopolymerization initiator such as an alkylphenone-based photopolymerization initiator, an acylphosphine oxide-based photopolymerization initiator, a titanocene-based photopolymerization initiator, an oxime ester, or an oxyphenylacetic acid ester photopolymerization initiator is used as the curing material. In a case of using cationic polymerization epoxy, vinyl ether, or oxetane as the compatible material, a photocationic initiator such as an iodonium salt-based photocationic initiator or a sulfonium salt-based photocationic initiator is used as the curing material.

The curing agent ejection head 20 ejects the curing agent, which is supplied from the curing agent containing unit 18, in response to an instruction from the CPU 12A. As the curing agent ejection head 20, an ink jet head is used, for example.

The UV head 21 irradiates the molded article forming agent that is ejected from the molded article forming agent ejection head 16 and the curing agent that is ejected from the curing agent ejection head 20 with the UV light in a Z direction to promote curing. In doing so, the curing proceeds while a state of permeation into the molded article forming agent after the curing agent is added dropwise is kept constant, and stable quality is achieved. As the UV head 21, a xenon lamp, an LED, a mercury lamp, a halogen lamp, or a metal halide lamp, for example, is used.

As the molded article forming agent, a thermosetting molded article forming agent may be used instead of the UV curable molded article forming agent. In such a case, a laser irradiation head that promotes the curing of the thermosetting molded article forming agent by irradiating the molded article forming agent with a laser, for example, may be used instead of the UV head 21. Alternatively, an infrared light irradiation head that promotes the curing of the thermosetting molded article forming agent by irradiating the molded article forming agent with the infrared light may be used.

As the thermosetting molded article forming agent, epoxy resin or polyol resin, for example, is used. In a case of using epoxy resin as the compatible material of the curing agent, amines, polyamide resin, imidazole, mercaptan, phenol, acid anhydrides, or a Lewis acid complex compound is used as the curing material. In a case of using polyol resin as the compatible material of the curing agent, isocyanate or the like is used as the curing material.

In any one of the case of using the UV curable molded article forming agent and the case of using the thermosetting molded article forming agent, concentration of the molded article forming agent to be mixed into the curing agent, namely the concentration of the compatible material is preferably from 1% by weight to 50% by weight, for example, and more preferably from 10% by weight to 30% by weight.

Figure 2:
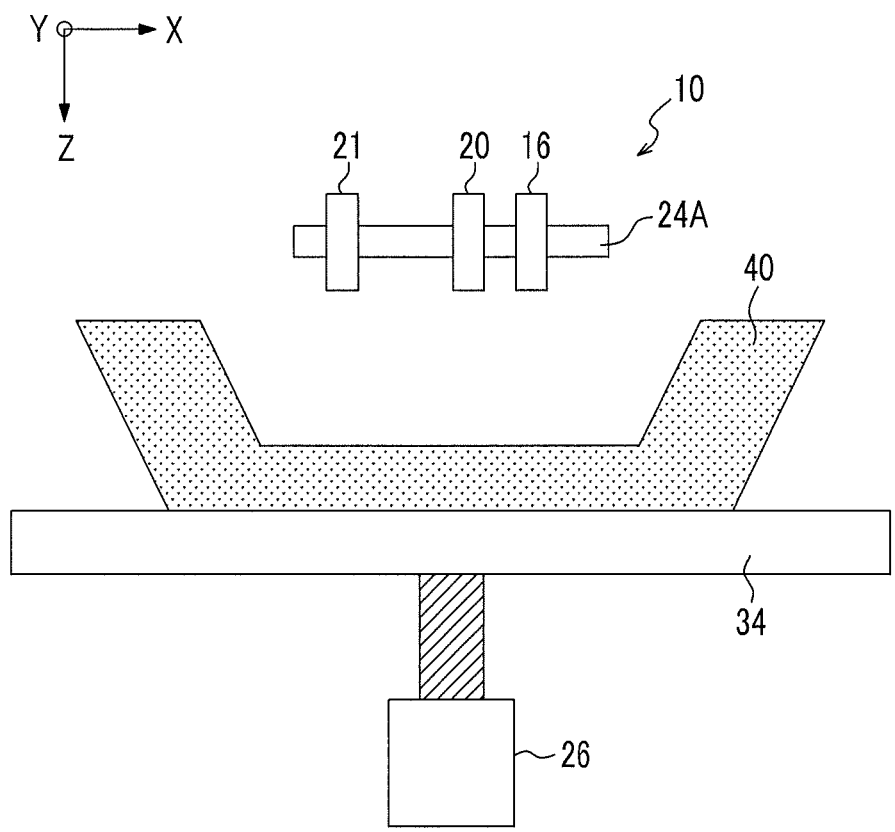
FIG. 2 is a side view of the apparatus for manufacturing a three-dimensional shaped product according to the first exemplary embodiment.

As illustrated in FIG. 2, the molded article forming agent ejection head 16, the curing agent ejection head 20, and the UV head 21 are attached, in this order, to a scanning axis 24A that is provided in the scanning unit 24. Therefore, the molded article forming agent ejection head 16, the curing agent ejection head 20, and the UV head 21 are scanned in a synchronized manner. In addition, the curing agent ejection head 20 and the UV head 21 are attached to the scanning axis 24A such that an interval between the curing agent ejection head 20 and the UV head 21 in an X direction is adjustable. In doing so, it is possible to adjust a distance, that is, a time until the irradiation with the UV light is performed by the UV head 21 after the curing agent is ejected onto the molded article forming agent from the curing agent ejection head 20. The interval between the curing agent ejection head 20 and the UV head 21 in the X direction is set in accordance with a permeation time until the curing agent permeates the molded article forming agent after the curing agent is ejected onto the molded article forming agent. In doing so, it becomes possible to adjust the state of permeation into the molded article forming agent after the curing agent is added dropwise and to achieve stability against variations in environmental conditions.

Figure 3:
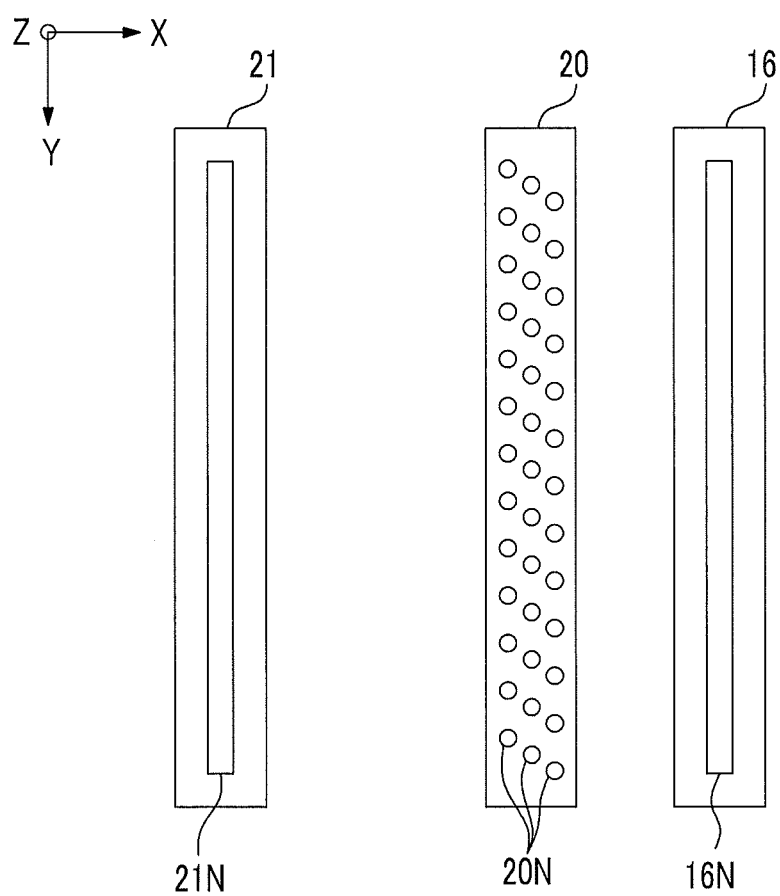
FIG. 3 is a bottom view of a head.

FIG. 3 is bottom view of the molded article forming agent ejection head 16, the curing agent ejection head 20, and the UV head 21, that is, a diagram viewed from the lower side to the upper side in the Z direction in FIG. 2. As illustrated in FIG. 3, the molded article forming agent ejection head 16, the curing agent ejection head 20, and the UV head 21 have long shapes that extend in a Y direction as a longitudinal direction. In addition, the length of the molded article forming agent ejection head 16, the curing agent ejection head 20, and the UV head 21 in the Y direction is at least equal to or greater than the width of the three-dimensional shaped product.

The molded article forming agent ejection head 16 is provided with an opening 16N that extends in the Y direction as a longitudinal direction and ejects the molded article forming agent from the opening 16N.

The curing agent ejection head 20 is provided with multiple nozzles 20N that are arranged in a two-dimensional manner along the Y direction and ejects the curing agent from nozzles 20N that are selected based on the shape of the three-dimensional shaped product. In addition, the nozzles 20N may be arranged in a one-dimensional manner along the Y direction.

The UV head 21 is provided with an opening 21N that extends in the Y direction as a longitudinal direction and performs irradiation with the UV light in the Y direction as a longitudinal direction from the opening 21N.

The scanning unit 24 drives the scanning axis 24A such that the molded article forming agent ejection head 16, the curing agent ejection head 20, and the UV head 21 move in the X direction, that is, so as to perform scanning in a one-dimensional manner.

Another configuration is also applicable in which the molded article forming agent ejection head 16, the curing agent ejection head 20, and the UV head 21 do not have such long shapes and the scanning is performed in a two-dimensional manner in the X direction and the Y direction.

The shaping stand elevating unit 26 elevates a shaping stand 34 illustrated in FIG. 2 in the Z direction. In manufacturing the three-dimensional shaped product, the CPU 12A controls the molded article forming agent ejection head 16, the curing agent ejection head 20, and the UV head 21 such that the ejection of the molded article forming agent, the ejection of the curing agent, and the irradiation of the ejected molded article forming agent and the curing agent with the UV light are repeated. In addition, the CPU 12A controls the scanning unit 24 such that the molded article forming agent ejection head 16, the curing agent ejection head 20, and the UV head 21 are scanned in the X direction, and controls the shaping stand elevating unit 26 such that the shaping stand 34 is gradually lowered in the Z direction.

Specifically, the CPU 12A first causes the molded article forming agent ejection head 16 to eject a molded article forming agent 16A onto the shaping stand 34 while scanning the molded article forming agent ejection head 16, the curing agent ejection head 20, and the UV head 21 in the X direction as illustrated in FIG. 4A. In doing so, a molded article forming agent layer 16-1 is formed. The thickness of the molded article forming agent layer 16-1 is approximately 100 μm, for example.

Next, the molded article forming agent ejection head 16, the curing agent ejection head 20, and the UV head 21 are returned to the original positions. Then, the molded article forming agent ejection head 16, the curing agent ejection head 20, and the UV head 21 are scanned again in the X direction, and the curing agent ejection head 20 is made to eject a curing agent 20A onto a position on the molded article forming agent layer 16-1 as a target of curing, namely a position at which the three-dimensional shaped product is formed, as illustrated in FIG. 4B. In doing so, the curing of the molded article forming agent in a region 20B-1 to which the curing agent 20A has been ejected is started. Then, irradiation with a UV light 21A by the UV head 21 promotes the curing of the molded article forming agent, and main curing is made to proceed.

Then, the molded article forming agent ejection head 16, the curing agent ejection head 20, and the UV head 21 are returned to the original positions, and the shaping stand 34 is lowered in the Z direction by a distance corresponding to the thickness of the molded article forming agent layer 16-1. Then, the molded article forming agent ejection head 16, the curing agent ejection head 20, and the UV head 21 are scanned again in the X direction, and the molded article forming agent ejection head 16 is made to eject the molded article forming agent 16A onto the molded article forming agent layer 16-1 as illustrated in FIG. 4C. In doing so, a molded article forming agent layer 16-2 is formed.

Next, the molded article forming agent ejection head 16, the curing agent ejection head 20, and the UV head 21 are returned to the original positions. The molded article forming agent ejection head 16, the curing agent ejection head 20, and the UV head 21 are then scanned again in the X direction, the curing agent ejection head 20 is made to eject the curing agent 20A onto a position on the molded article forming agent layer 16-2 as a target of curing, and the UV head 21 is made to perform irradiation with the UV light 21A, as illustrated in FIG. 4D. In doing so, the molded article forming agent in a region 20B-2 to which the curing agent 20A has been ejected is cured, and the UV light of the irradiation from the UV head 21 further promotes the curing.

In addition, the curing agent 20A may be added dropwise as a smaller drop than that of a curing agent in the related art. For this reason, it is possible to improve controllability as compared with a case of using a large drop of curing agent with low viscosity and to thereby enhance resolution in a planar direction and to increase a stacking speed. Since materials of the curing agent may be selected from a wider range than that in the related art, there are more possibilities for application to engineering plastic and the like.

By repeating the ejection of the molded article forming agent 16A, the ejection of the curing agent 20A, and the irradiation of the ejected molded article forming agent 16A and the curing agent 20A with the UV light 21A as described above, the molded article forming agent is stacked. Then, the three-dimensional shaped product is obtained by removing unnecessary molded article forming agent 16A in a region other than the region in which the molded article forming agent 16A is cured by the ejection of the curing agent 20A. The unnecessary molded article forming agent may be removed by mechanically peeling off the molded article forming agent, peeling off the molded article forming agent by heat, or melting and peeling off the molded article forming agent, for example.

In forming the three-dimensional shaped product, the CPU 12A controls the shaping stand elevating unit 26 such that a distance from the molded article forming agent ejection head 16, the curing agent ejection head 20, and the UV head 21 to the three-dimensional shaped product on the shaping stand 34 in the Z direction is equal to or greater than a predetermined distance in order not to bring the molded article forming agent ejection head 16, the curing agent ejection head 20, and the UV head 21 into contact with the three-dimensional shaped product on the shaping stand 34.

The cleaning unit 28 has a function of cleaning the molded article forming agent ejection head 16, the curing agent ejection head 20, and the UV head 21 by suctioning the materials attached thereto, for example. For example, the cleaning unit 28 is provided in an evacuation region outside the scanning region of the molded article forming agent ejection head 16, the curing agent ejection head 20, and the UV head 21 and performs cleaning by causing the molded article forming agent ejection head 16, the curing agent ejection head 20, and the UV head 21 to be evacuated to the evacuation region when the cleaning unit performs cleaning.

The storage unit 30 stores a program 30A for manufacturing a three-dimensional shaped product, which will be described later, and curing agent ejection data 30B. The curing agent ejection data 30B is data that indicates a region (coordinates) to which the curing agent is to be ejected. In addition, the region to which the curing agent is to be ejected is a region in which the three-dimensional shaped product is to be formed.

The CPU 12A reads and executes the manufacturing program 30A that is stored on the storage unit 30. In addition, a configuration is also applicable in which the manufacturing program 30A is recorded in a recording medium such as a CD-ROM, is read by a CD-ROM drive or the like, and is then executed.

The communication unit 32 is an interface for communicating data to and from an external device that outputs the curing agent ejection data 30B relating to the three-dimensional shaped product.

The CPU 12A manufactures the three-dimensional shaped product by executing the manufacturing program 30A in accordance with the curing agent ejection data 30B that is transmitted from the external device.

Next, a description will be given of the operations according to this exemplary embodiment. FIG. 5 is a flowchart of the manufacturing program 30A that is executed by the CPU 12A. In addition, the processing illustrated in FIG. 5 is executed when an instruction for manufacturing a three-dimensional shaped product is provided from the external device.

Figure 6A:
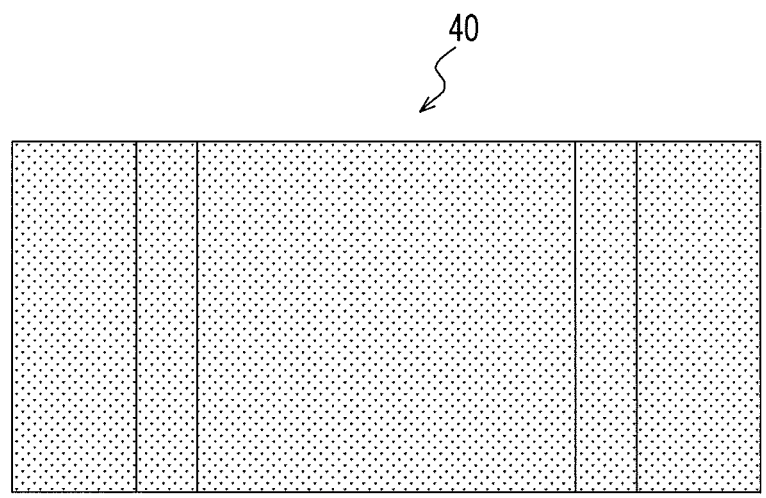
FIG. 6A is a plan view of a three-dimensional shaped product.
Figure 6B:
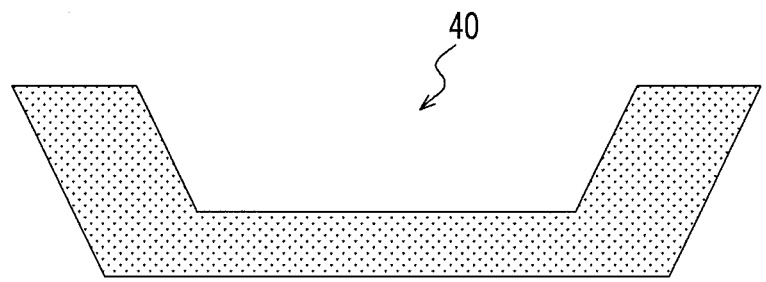
FIG. 6B is a side view of the three-dimensional shaped product.

In this exemplary embodiment, an example will be described in which a three-dimensional shaped product 40 as illustrated in FIGS. 6A and 6B is manufactured. FIG. 6A is a plan view of the three-dimensional shaped product 40, and FIG. 6B is a side view of the three-dimensional shaped product 40.

In Step S100, the curing agent ejection data 30B is received from the external device and is stored on the storage unit 30. As a format of the curing agent ejection data 30B, the Standard Triangulated Language (STL) format, which is a data format for expressing a three-dimensional shape, is used, for example. However, the format of the curing agent ejection data 30B is not limited thereto.

In Step S102, slice data is created by slicing the three-dimensional shaped product, which is formed by the molded article forming agent cured by the curing agent, in the Z direction in the XY plane, namely in the stacking direction based on the curing agent ejection data 30B that is received in Step S100. In doing so, multiple slice data pieces obtained by slicing the three-dimensional shaped product 40 in the XY plane are created in the stacking direction.

Figure 7:
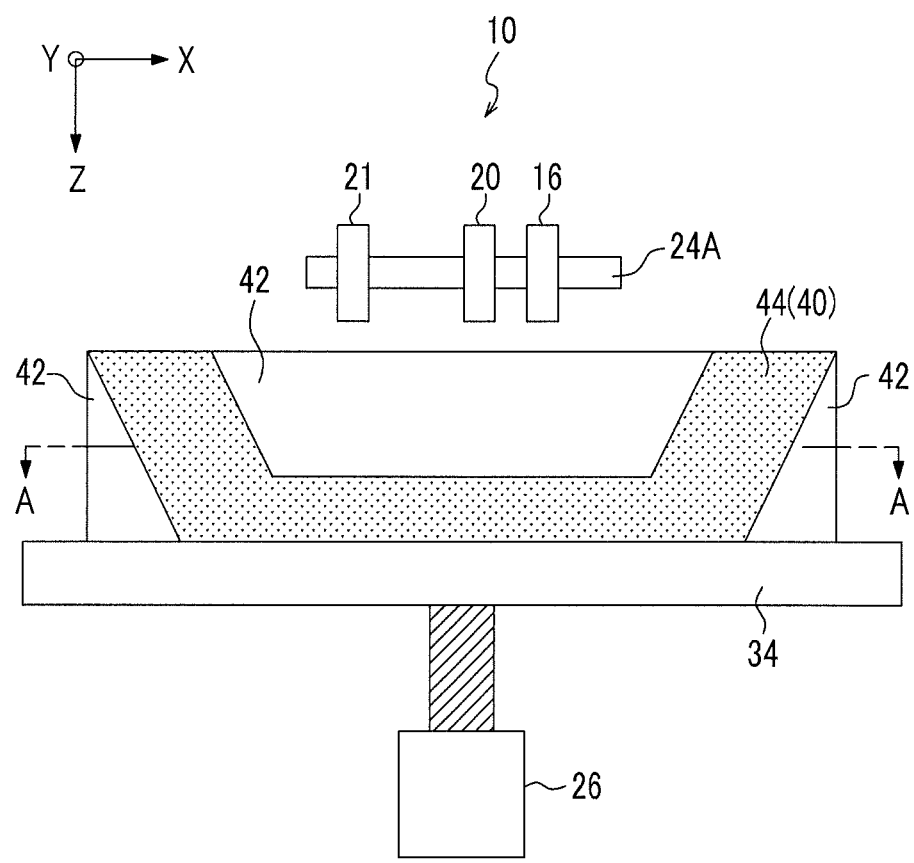
FIG. 7 is a side view of the apparatus for manufacturing the three-dimensional shaped product.
Figure 8:
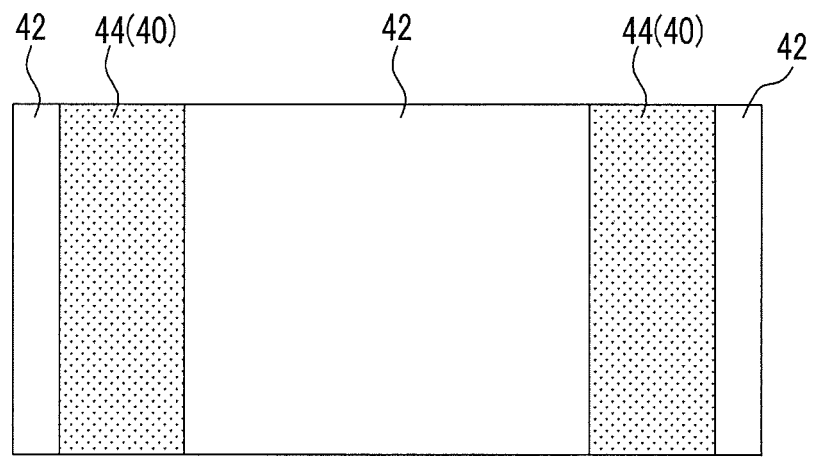
FIG. 8 is a cross-sectional view taken along the line VIII-VIII in FIG. 7.

For example, FIG. 8 illustrates slice data of the three-dimensional shaped product 40 illustrated in FIG. 7, which is taken along the line VIII-VIII. As illustrated in FIG. 8, a region 42 corresponds to a region to which the curing agent 20A is not ejected, that is, a region in which only the molded article forming agent 16A is present. A region 44 corresponds to a region to which the curing agent 20A is ejected, that is, a region that configures the three-dimensional shaped product 40.

In Step S104, molded article forming agent layer formation processing is executed. That is, the scanning unit 24 is controlled to scan the molded article forming agent ejection head 16, the curing agent ejection head 20, and the UV head 21 in the X direction, and the molded article forming agent ejection head 16 is controlled to eject the molded article forming agent 16A in accordance with the slice data generated in Step S102. Then, the molded article forming agent ejection head 16, the curing agent ejection head 20, and the UV head 21 are returned to the original positions after the molded article forming agent layer is formed.

In Step S106, irradiation with the UV light is started. That is, the UV head 21 is controlled to perform irradiation with the UV light from the UV head 21.

In Step S108, curing agent ejection processing is executed. That is, the scanning unit 24 is controlled to scan the molded article forming agent ejection head 16, the curing agent ejection head 20, and the UV head 21 in the X direction, and the curing agent ejection head 20 is controlled to eject the curing agent 20A in accordance with the slice data generated in Step S102. In doing so, the region 44 to which the curing agent 20A is ejected in the molded article forming agent layer formed in Step S104 is cured, and the curing of the region to which the curing agent 20A is ejected is promoted by further irradiation with the UV light. Then, the molded article forming agent ejection head 16, the curing agent ejection head 20, and the UV head 21 are returned to the original positions after the molded article forming agent layer is formed.

In Step S110, the irradiation with the UV light is stopped. That is, the UV head 21 is controlled to stop the irradiation with the UV light from the UV head 21.

In Step S112, the shaping stand elevating unit 26 is controlled to lower the shaping stand 34 in the Z direction by a distance corresponding to one layer.

In Step S114, it is determined whether or not the structure formation has been completed. If the structure formation has not been completed, the processing moves on to Step S116. If the structure formation has been completed, the routine is completed.

In Step S116, it is determined whether or not a timing at which cleaning of the molded article forming agent ejection head 16 and the curing agent ejection head 20 is executed has been reached. If the timing at which the cleaning is executed has been reached, the processing moves onto Step S118. In contrast, if the timing at which the cleaning is executed has not been reached, the processing moves on to Step S104, and the structure formation processing continues with the following layer.

As for a timing at which the cleaning is performed, the cleaning may be performed every time a predetermined period of time has passed, or every time a predetermined amount of at least one of the molded article forming agent 16A and the curing agent 20A is consumed, for example. However, the timing is not limited thereto.

In a case in which the cleaning is performed every time a predetermined period of time has elapsed, it is preferable that clogging states of the molded article forming agent ejection head 16 and the curing agent ejection head 20 are measured while various periods are employed and the longest period among periods during which the clogging does not occur is set. This is because the number of times of cleaning increases as the period becomes shorter and a time required for completing the structure formation processing increases. In doing so, unnecessary cleaning is suppressed.

In Step S118, an instruction for moving the molded article forming agent ejection head 16 and the curing agent ejection head 20 to the evacuation region is provided to the scanning unit 24, and an instruction for cleaning the molded article forming agent ejection head 16 and the curing agent ejection head 20 is provided to the cleaning unit 28. In doing so, the molded article forming agent ejection head 16 and the curing agent ejection head 20 move to the evacuation region, and the cleaning unit 28 cleans the molded article forming agent ejection head 16 and the curing agent ejection head 20. In a case in which the cleaning is performed every time at least one of the molded article forming agent 16A and the curing agent 20A is consumed by a predetermined amount, only the head that ejects the material that has been consumed by the predetermined amount may be cleaned.

The unnecessary molded article forming agent 16A is removed by mechanically peeling off the molded article forming agent, peeling off the molded article forming agent by heat, or melting and peeling off the molded article forming agent, for example, after the completion of the processing in FIG. 5.

Since the curing agent according to this exemplary embodiment is a two-liquid type curing agent that contains not only the curing material for curing the molded article forming agent but also the molded article forming agent itself as the compatible material that is compatible with the molded article forming agent, spreading of the curing agent and degradation in resolution are suppressed as compared with a case in which the molded article forming agent is cured by using a curing agent that does not contain a compatible material that is compatible with the molded article forming agent.

Second Exemplary Embodiment

Next, a description will be given of a second exemplary embodiment of the present invention. The same reference numerals will be given to the same components as those in the first exemplary embodiment, and detailed descriptions thereof will be omitted.

Figure 9:
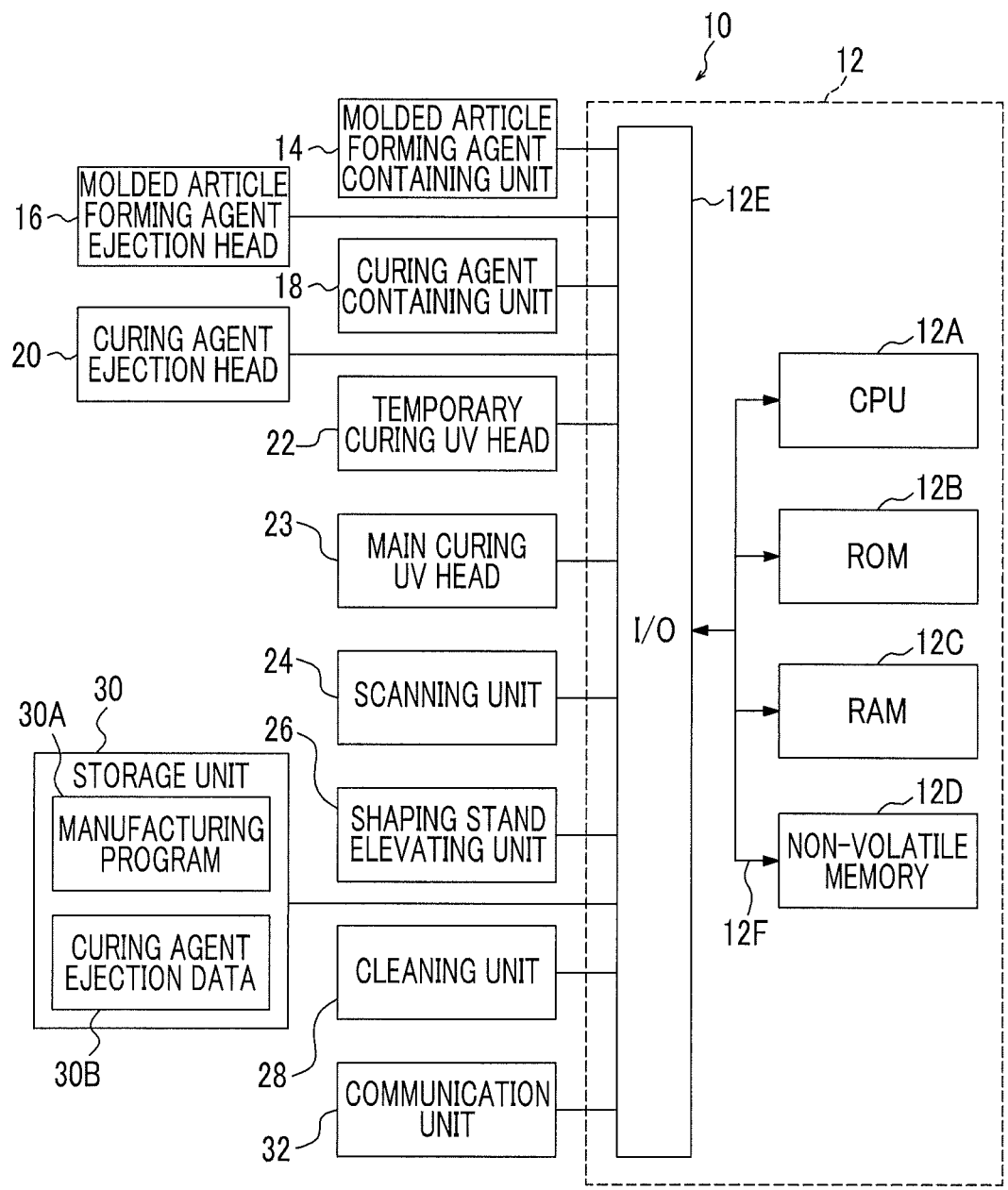
FIG. 9 is a block diagram of an apparatus for manufacturing a three-dimensional shaped product according to a second exemplary embodiment.

FIG. 9 is a block diagram of an apparatus 10A for manufacturing a three-dimensional shaped product according to the second exemplary embodiment. The manufacturing apparatus 10A illustrated in FIG. 9 is different from the manufacturing apparatus 10 illustrated in FIG. 1 in that the manufacturing apparatus 10A is provided with a temporary curing UV head 22 and a main curing UV head 23 instead of the UV head 21.

The temporary curing UV head 22 has the same configuration as that of the UV head 21 described above in the first exemplary embodiment.

Figure 10:
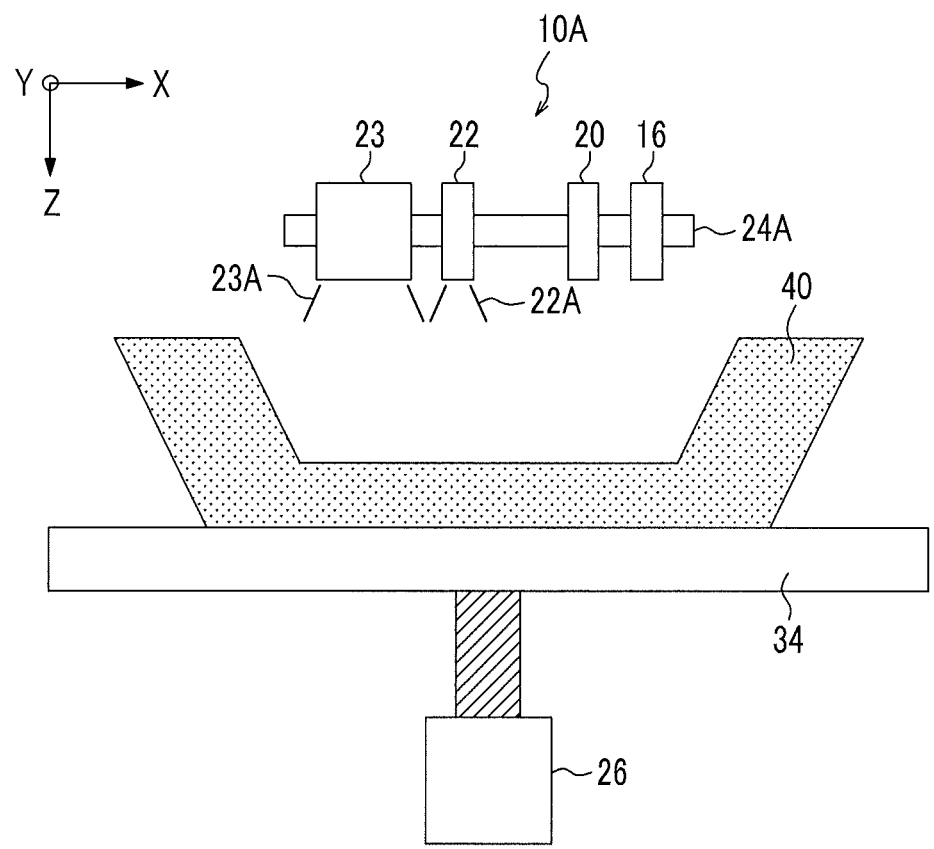
FIG. 10 is a side view of the apparatus for manufacturing the three-dimensional shaped product according to the second exemplary embodiment.

The main curing UV head 23 is longer than the temporary curing UV head 22 in the X direction as illustrated in FIG. 10. That is, an irradiation range of a UV light 23A from the main curing UV head 23 is wider than an irradiation range in the X direction of a UV light 22A from the temporary curing UV head 22.

The CPU 12A of the controller 12 controls the temporary curing UV head 22 and the main curing UV head 23 such that an intensity of the UV light for the temporary curing that is emitted from the temporary curing UV head 22 is lower than an intensity of the UV light for the main curing that is emitted from the main curing UV head 23.

Figure 11:
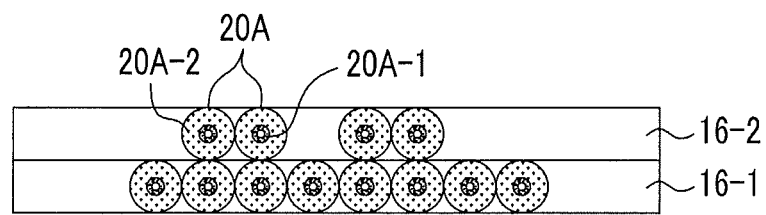
FIG. 11 is a diagram illustrating temporary curing and main curing.

Therefore, the curing agent 20A that is ejected onto the molded article forming agent layers 16-1 and 16-2 is not completely cured, the center thereof forms an uncured region 20A-1, and the periphery thereof forms a cured region 20A-2 as illustrated in FIG. 11 before the irradiation with the UV light 23A for the main curing by the main curing UV head 23 after the irradiation with the UV light 22A for the temporary curing by the temporary curing UV head 22.

Figure 12:
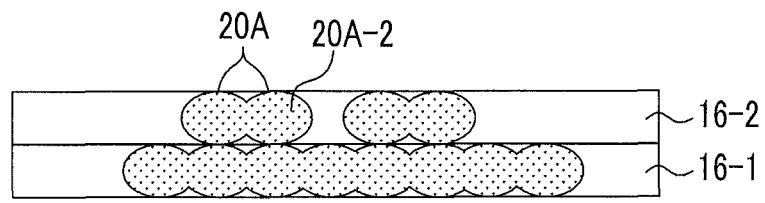
FIG. 12 is a diagram illustrating the main curing.

After the irradiation with the UV light 23A for the main curing by the main curing UV head 23, the uncured region 20A-1 is not present, and only the cured region 20A-2 after the main curing has completely proceeded up to the center thereof is present as illustrated in FIG. 12.

By setting the intensity of the UV light from the temporary curing UV head 22 that is closer to the molded article forming agent ejection head 16 and the curing agent ejection head 20 to be lower, it is possible to suppress curing of the molded article forming agent that adheres to the molded article forming agent ejection head 16 and the curing agent that adheres to the curing agent ejection head 20 by reflected UV light and to thereby suppress clogging of the molded article forming agent ejection head 16 and the curing agent ejection head 20.

The CPU 12A controls the temporary curing UV head 22 such that the UV light 22A for the temporary curing is emitted from the temporary curing UV head 22, and controls the main curing UV head 23 such that the UV light 23A for the main curing is emitted from the main curing UV head 23 in Step S106 of the flowchart in FIG. 5. At this time, the intensity of the UV light 23A that is emitted from the temporary curing UV head 22 is set to be lower than the intensity of the UV light 23A that is emitted from the main curing UV head 23.

Figure 13A:
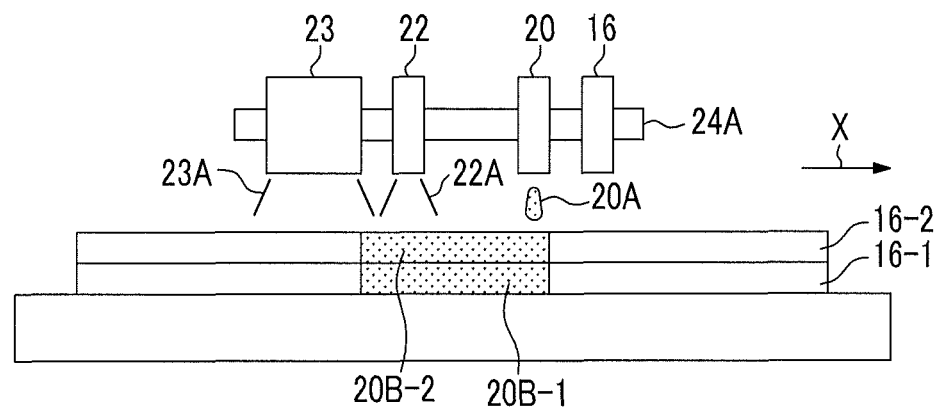
FIG. 13A is a diagram illustrating a case in which the temporary curing and the main curing are performed for each layer.

In doing so, the curing agent 20A is ejected, the UV light 22A for the temporary curing is emitted from the temporary curing UV head 22, and the UV light 23A for the main curing is emitted from the main curing UV head 23 as illustrated in FIG. 13A every time one molded article forming agent layer is formed.

Then, the temporary curing UV head 22 is controlled such that the irradiation with the UV light 22A for the temporary curing is stopped, and the main curing UV head 23 is controlled such that the irradiation with the UV light 23A for the main curing is stopped in Step S110 in FIG. 5. Other processing is the same as that in the first exemplary embodiment.

Figure 13B:
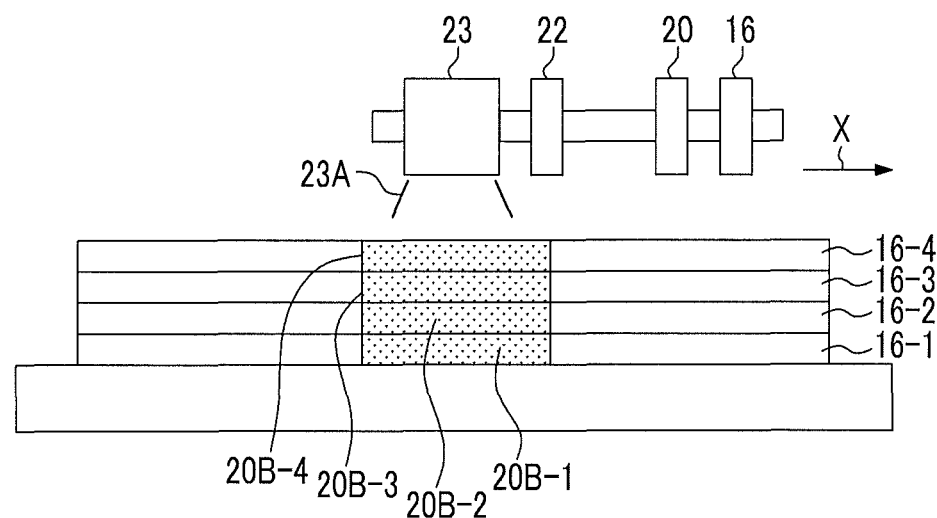
FIG. 13B is a diagram illustrating a case in which the main curing is performed every several layers.

Although both the temporary curing and the main curing may be performed every time one molded article forming agent layer is formed as described above, a configuration is also applicable in which the temporary curing is performed every time one molded article forming agent layer is formed and the main curing is performed every several layers. For example, as illustrated in FIG. 13B, a configuration is applicable in which the main curing UV head 23 is stopped above the regions 20B-1 to 20B-4, to which the curing agent 20A has been ejected, and the irradiation with the UV light 23A is performed for a predetermined period every time four molded article forming agent layers are formed such that the regions 20B-1 to 20B-4 are collectively subjected to the main curing. In such a case, Steps S106 and S110 in FIG. 5 may be performed only in relation to the temporary curing UV head 22, and the main curing UV head 23 may irradiate the region, to which the curing agent 20A has been ejected, with the UV light 23A every time multiple molded article forming agent layers are formed. In doing so, it is possible to suppress energy consumption that is required for the main curing and to shorten the manufacturing time.

Figure 14:
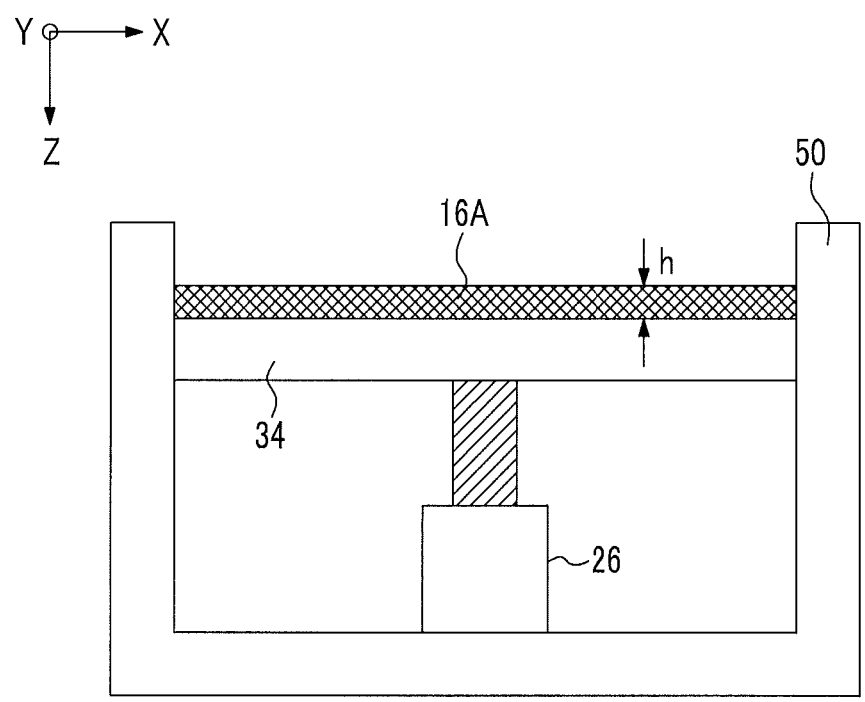
FIG. 14 is a diagram illustrating a modification example of the apparatus for manufacturing a three-dimensional shaped product.

Although the above descriptions of the respective exemplary embodiments are about the configuration in which the molded article forming agent layers are formed by the molded article forming agent ejection head 16 ejecting the molded article forming agent onto the shaping stand 34, the exemplary embodiments are not limited thereto. For example, the shaping stand 34 may be provided in a container that is filled with the molded article forming agent. The molded article forming agent layers may be formed by providing the molded article forming agent 16A to the inside of a container 50 and controlling a height h from the upper surface of the shaping stand 34 to the liquid surface of the molded article forming agent 16A as illustrated in FIG. 14, for example.

Although the above descriptions of the respective exemplary embodiments are about the configuration in which the irradiation with the UV light is performed after the ejection of the curing agent, a configuration is also applicable in which the irradiation with the UV light is not performed.

Although the above descriptions of the respective exemplary embodiments are about the case in which the shaping stand 34 is gradually lowered in the X direction while the molded article forming agent ejection head 16 and the like are scanned in the X direction, a configuration is also applicable in which the shaping stand 34 is fixed and the molded article forming agent ejection head 16 and the like are gradually lifted in the Z direction while being scanned in the X direction. Alternatively, both the molded article forming agent ejection head 16 and the like and the shaping stand 34 may move so as to be separate from each other in the Z direction.

The configuration (see FIG. 1) of the manufacturing apparatus 10 described in the aforementioned exemplary embodiments is an exemplary configuration, and it is needless to say that unnecessary components may be deleted therefrom or new components may be added without departing from the gist of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. A curing agent for a three-dimensional shaped product comprising:
   a compatible material that is compatible with a molded article forming agent for forming a three-dimensional shaped product; and a curing material that cures the molded article forming agent, wherein the curing agent is a mixture of the compatible material and the curing material, wherein the curing agent comprises 1% to 30% by weight of the compatible material with respect to the amount of the compatible material and the curing material in the mixture, and wherein:

the compatible material is an epoxy (meth)acrylate, a urethane (meth)acrylate, or a polyester (meth)acrylate, and the curing material is one or more of an alkylphenone-based photopolymerization initiator, an acylphosphine oxide-based photopolymerization initiator, a titanocene-based photopolymerization initiator, an oxime ester, or an oxyphenylacetic acid ester photopolymerization initiator, or the compatible material is a cationic polymerization epoxy, a vinyl ether, or an oxetane, and the curing material is one or more of an iodonium salt-based photocationic initiator or a sulfonium salt-based photocationic initiator, or the compatible material is an epoxy resin, and the curing material is one or more of an amine, a polyamide resin, an imidazole, a mercaptan, a phenol, an acid anhydride or a Lewis acid complex compound, or the compatible material is a polyol resin, and the curing material is an isocyanate.

2. The curing agent for a three-dimensional shaped product according to claim 1, wherein the compatible material is the molded article forming agent.

* * * * *